(12) United States Patent
Birtcher et al.

(10) Patent No.: US 8,002,247 B2
(45) Date of Patent: Aug. 23, 2011

(54) CROSS PURGE VALVE AND CONTAINER ASSEMBLY

(75) Inventors: Charles Michael Birtcher, Valley Center, CA (US); Thomas Andrew Steidl, Escondido, CA (US); John Eric Baker, Temecula, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 237 days.

(21) Appl. No.: 12/464,922

(22) Filed: May 13, 2009

(65) Prior Publication Data

US 2010/0043918 A1 Feb. 25, 2010

Related U.S. Application Data

(60) Provisional application No. 61/091,155, filed on Aug. 22, 2008.

(51) Int. Cl.
*B01F 3/04* (2006.01)
(52) U.S. Cl. ............. 261/46; 137/560; 141/98; 261/52; 261/63; 261/64.1; 261/121.1
(58) Field of Classification Search .......... 261/35, 261/45, 46, 52, 63, 64.1, 119.1, 121.1, DIG. 65; 141/21, 65, 66, 98; 137/15.04, 560
See application file for complete search history.

(56) References Cited

U.S. PATENT DOCUMENTS

| 1,608,251 | A | * | 11/1926 | Shook et al. ............... 261/22 |
| 2,361,137 | A | * | 10/1944 | Terry et al. ................ 261/24 |
| 3,925,033 | A | * | 12/1975 | Mayo ........................ 48/144 |
| 4,276,243 | A | * | 6/1981 | Partus ....................... 261/128 |
| 4,436,674 | A | * | 3/1984 | McMenamin ............... 261/64.3 |
| 4,859,375 | A | * | 8/1989 | Lipisko et al. ............. 261/20 |
| 4,904,419 | A | * | 2/1990 | Reynolds .................... 261/64.1 |
| 5,035,200 | A | * | 7/1991 | Moriyama et al. ........... 118/693 |
| 6,056,024 | A | | 5/2000 | Noah et al. |
| 6,431,229 | B1 | * | 8/2002 | Birtcher et al. ............. 141/302 |
| 6,488,271 | B1 | * | 12/2002 | Nelson et al. .............. 261/121.1 |
| 6,712,093 | B2 | | 3/2004 | Hess et al. |
| 7,025,337 | B2 | * | 4/2006 | Curran ....................... 261/62 |

(Continued)

FOREIGN PATENT DOCUMENTS

JP 51-154729 U 12/1976

(Continued)

OTHER PUBLICATIONS

FURON HPV Diaphragm Valve, Saint-Gobain Performance Plastics, 2000.

(Continued)

*Primary Examiner* — Richard L Chiesa
(74) *Attorney, Agent, or Firm* — Geoffrey L. Chase

(57) ABSTRACT

The present invention is a quartz bubbler container with cross purge capability. This cross purge allows the user to easily purge air and chemical from the valve inlet and outlet by simply flowing inert gas, and avoids the requirement for a more complicated vacuum purging apparatus. The design incorporates two small footprint 3-way valves mounted on the bubbler container inlet and outlet connectors. The $3^{rd}$ port of each valve is piped together between the valves with a crosspurge line. The valves are corrosion resistant, leak free, maintenance free, non-leaching of impurities, and can accommodate an optional breakseal crusher that will perforate quartz break seals (on the inlet and outlet of ampoule). Liquid out containers of various materials of construction are also contemplated.

12 Claims, 7 Drawing Sheets

U.S. PATENT DOCUMENTS

| | | | |
|---|---|---|---|
| 2003/0042631 A1* | 3/2003 | Nelson et al. | 261/121.1 |
| 2005/0156338 A1* | 7/2005 | Curran | 261/64.3 |
| 2005/0229970 A1* | 10/2005 | Birtcher et al. | 137/240 |
| 2007/0085226 A1* | 4/2007 | Yoshioka et al. | 261/35 |
| 2007/0170604 A1* | 7/2007 | Soininen | 261/122.1 |

FOREIGN PATENT DOCUMENTS

| | | | | |
|---|---|---|---|---|
| JP | 63-87723 A | * | 4/1988 | 261/121.1 |
| JP | 63-104697 A | * | 5/1988 | 261/121.1 |
| JP | 07-260021 A | | 10/1995 | |
| KR | 2002-0039321 A | | 5/2002 | |
| WO | 99/64780 A | | 12/1999 | |
| WO | 2004/111509 A | | 12/2004 | |

OTHER PUBLICATIONS

Quartz Ampules-Source Containers, FUJIFILM Electronic Materials, Rev. Mar. 2005.

SWAGELOK small 3 valve manifold, Nov. 16, 2004.

* cited by examiner

CROSS PURGE VALVE AND CONTAINER ASSEMBLY

CROSS REFERENCE TO RELATED APPLICATIONS

This patent application claims the benefit of U.S. Provisional Patent Application Ser. No. 61/091,155 filed 22 Aug. 2008.

BACKGROUND OF THE INVENTION

The semiconductor fabrication industry utilizes an array of chemicals in solid, liquid and vapor phase in storage and dispense under standard temperatures and pressures, such as ambient conditions. These chemicals can have widely varying vapor pressures and viscosities based upon their chemical structures and whether they are in their neat or pure form or are contained in a solvent.

Chemicals are typically utilized by the semiconductor fabrication industry by dispensing them from containers of varying sizes and capacities into reaction chambers where the chemicals are utilized to fabricate a semiconductor device such as integrated circuits, memory devices and photovoltaic devices.

Regardless of the size of the chemical container, at some point in time the semiconductor fabricator will need to replace a chemical container that is depleted of chemical or detach a chemical container for other service requirements.

The detachment or replacement of a chemical container in a semiconductor fab Is not an insignificant activity. These chemicals are typically required at extremely high purities and frequently cannot be exposed to air or uncontrolled outside conditions that might effect the chemicals purity during such a detachment or replacement of the chemicals' container.

In addition, these chemicals frequently can react adversely to moisture and/or oxygen in air. Such reactions can lead to contaminating by-product impurities which may plug the container or delivery lines and cause corrosion or contamination or both.

The semiconductor fabrication industry continues to seek containers and delivery equipment that will meet the needs identified above, while being compact, simple in construction and having a small footprint near the reactor that the container services. The present invention meets those long felt needs as will be more fully described below.

BRIEF SUMMARY OF THE INVENTION

The present invention is a container and valve-crosspurge assembly for storing and dispensing high purity process chemical, comprising;

(A) a container for containing a high purity process chemical having an inlet and an outlet for dispensing high purity process chemical and introducing a carrier gas to assist in dispensing the high purity process chemical;

(B) a valve-crosspurge fitting comprising;
 (i) a first valve; and,
 (ii) a second valve,
one of such valves connected to the inlet of the container and the other of such valves connected to the outlet of such container; and,
 (iii) a crosspurge connection between the first and second valves that provides fluid flow connection between the two valves separately from the container; wherein, each valve has;

(a) a first orifice to the container;
(b) a second orifice to a conduit for fluid flow connection outside the assembly; and,
(c) a third orifice to the crosspurge connection axially displaced a first distance from the second orifice in the valve;
(d) a valve housing; and,
(e) a valve stem capable of moving in the valve housing to one of two positions: (1) container open and (2) crosspurge open-container closed; wherein, the valve stem has three valve sealing surfaces:
 (I) a first valve sealing surface configured to seal against a first valve seat to close the first orifice to the container;
 (II) a second valve sealing surface of enlarged cross-section, relative to the primary valve stem cross-section, configured to seal against inside wall of the valve housing to close the second orifice to the first orifice; and,
 (III) a third valve sealing surface of enlarged cross-section, relative to the primary valve stem cross-section, configured to seal against inside wall of the valve housing to form with the second valve sealing surface a flow passage between the third orifice of the crosspurge connection and the second orifice, wherein the axial spacing of the second valve sealing surface from the third valve sealing surface on the valve stem is at least as great as the first distance, recited in (c) so as to form the flow passage, recited in (III).

In an alternative embodiment, the valve stem has only two sealing surfaces, excluding the first sealing surface.

DETAILED DESCRIPTION OF THE INVENTION

Figure 1A:
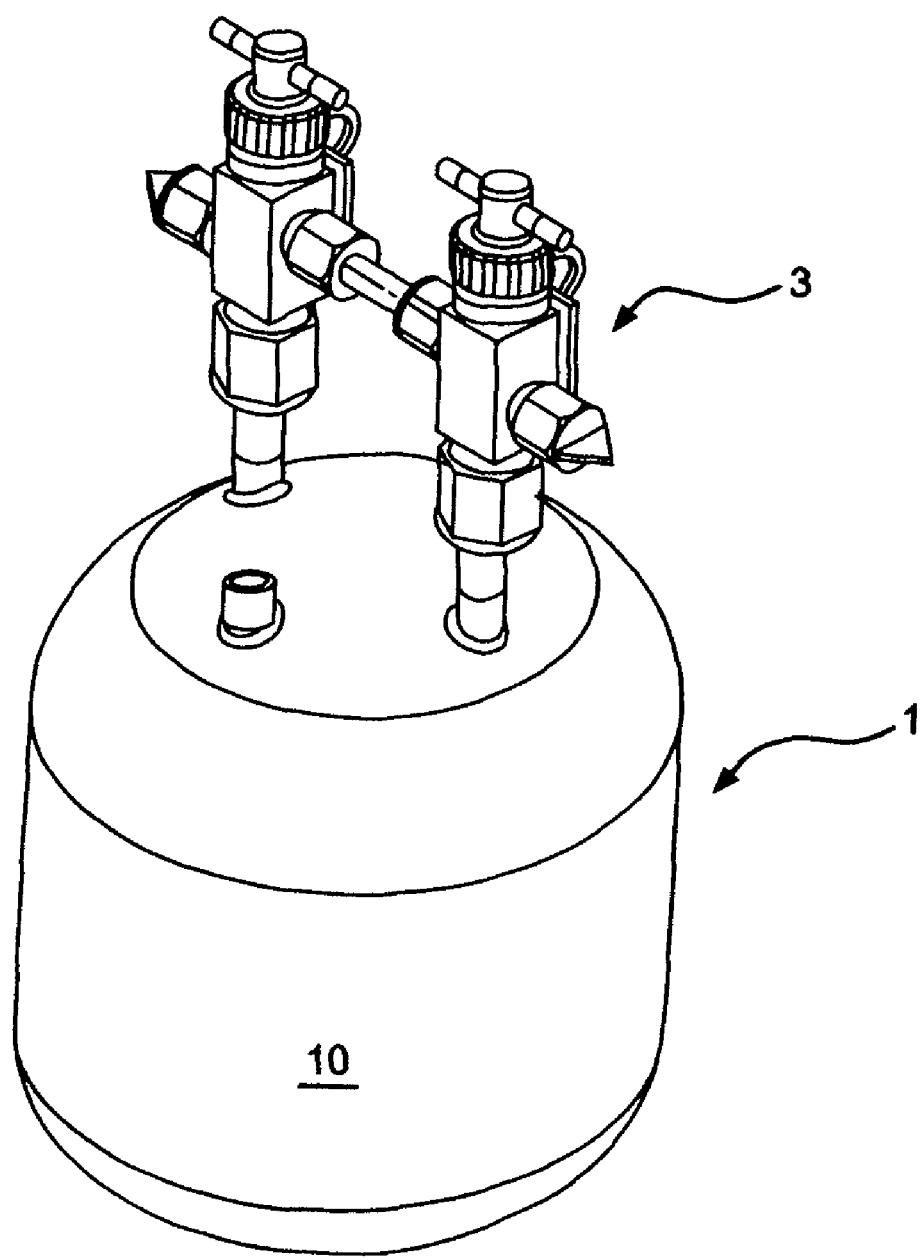
FIGS. 1A and 1B are perspective views of embodiments of the present invention illustrating a high purity chemical container with a valve-crosspurge fitting in a straight line alignment or a "U" shaped alignment with valve outlets facing opposite directions from one another or facing the same direction, respectively.

The present invention is directed to a container for high purity process chemicals with improved valving and purge cleaning of the valves during a non-dispense mode of the container.

These types of containers are frequently used in the semiconductor fabrication industry, the photovoltaics industry and other industries where precise control and a high degree of cleanliness of the apparatus and purity of the process chemical is important.

In the semiconductor fabrication industry, these containers are typically constructed of glass, particularly quartz or metals, such as stainless steel. Steel containers are typically electropolished or surface treated to remove particles and create a smooth surface which is easy to clean and is resistant to undesired surface sorption of the process chemicals.

High purity process chemicals in the semiconductor fabrication industry typically have metal impurity specifications preferably no greater than parts per billion (ppb) levels and preferably have other contaminants, such as organics, at or below the detection limits of analytical instruments used in the industry.

High purity process chemicals can include Phosphorus Oxychloride ($POCl_3$), Tetraethyl Orthosilicate, Trimethylphosphate, Triethylphosphate, Trimethylphosphite, Trimethylborate, Triethylborate, 1,2bis(methylsilyl)ethane, Diethylsilane, Tetramethoxygermane, Tetramethylcyclotetrasiloxane, tetrakis-diethylamido hafnium, tetrakis-dimethylamino silane, Tetrakis (diethylamino) Titanium, Tetrakis (dimethylamino) Titanium, Titanium Tetrachloride, Dimethylaluminum hydride, Dimethylaluminum hydride ● DMEA, Dimethylaluminum hydride ● TMA, Dimethylethylamine alane, Stabilized Dimethylethylamine alane, Fluorotriethoxysilane, 1,2bis(methyldifluorosilyl)ethane, 1,2bis(trifluorosilyl)ethane, Poly(arylene ether)polymer, Tantalum Pentaethoxide, Titanium Isopropoxide, Tantalum Tetraethoxide Dimethylaminoethoxide, Barium Strontium Titanate, Terbutylimidotris(diethylamido)tantalum, Trans 1,2-Dichloroethylene, 1,1,1-Trichloroethane, Methylene Chloride, Trifluoroacetic anhydride, Triethylarsenate, Boron Tribromide, Antimony Trioxide, Phosphorus Tribromide, Phosphorus Trichloride, Red Phosphorus, Arsenic, Antimony Trioxide, tetrakis(dimethylamino)titanium, tetrakis(diethylamino)titanium, tetrakis(ethylmethylamino)titanium, tetrakis(dimethylamino)zirconium, tetrakis(diethylamino)zirconium, tetrakis(ethylmethylamino)zirconium, tetrakis(dimethylamino)hafnium, tetrakis(diethylamino)hafnium, tetrakis(ethylmethylamino)hafnium, tert-butylimino tris (diethylamino)tantalum, tert-butylimino tris (dimethylamino)tantalum, tert-butylimino tris (ethylmethylamino)tantalum, ethyllimino tris(diethylamino) tantalum, ethyllimino tris(dimethylamino)tantalum, ethyllimino tris(ethylmethylamino)tantalum, tert-amylimino tris(dimethylamino)tantalum, tert-amylimino tris(diethylamino)tantalum, pentakis(dimethylamino)tantalum, tert-amylimino tris(ethylmethylamino)tantalum, bis(tert-butylimino)bis(dimethylamino)tungsten, bis(tert-butylimino)bis (diethylamino)tungsten, bis(tert-butylimino)bis (ethylmethylamino)tungsten, tris(tert-pentoxy)silanol,2,5-norbornadiene, and bicyclo-2,2,1-hepta-2,5-diene.

It is important with at least some of the high purity process chemicals listed above and other high purity process chemicals used by the semiconductor fabrication industry to be able to install, disconnect, changeout or replace the container filled with the high purity process chemical and this constitutes a technical challenge when the high purity process chemical is sensitive to moisture, is sensitive to oxygen, requires extremely high purity levels and/or the absence of impurities. In disconnecting such a container, any high purity process chemical remaining in the valving or conduits during a disconnect can potentially contact undesired atmospheres and create contamination, generate solid by-products or create corrosive and/or hazardous by-products.

The benefit of the present invention is the configuration of the valve-crosspurge fitting which allows simple valving in a compact design to operate in a dispense function and a crosspurge function to allow carrier gas or push gas to remove high purity process chemical from interior valve surfaces that have been exposed to high purity process chemical and to purge such residual chemical prior to any disconnect of the container or valves that might expose those interior valve surfaces to outside atmospheres. Similar purging of such atmospheres from the valve interiors after reconnection is possible prior to flow of high purity process chemical through the valve interior where such atmosphere might be captured upon reconnection.

The present invention will be illustrated in a particular embodiment with reference to the several drawings.

Figure 1B:
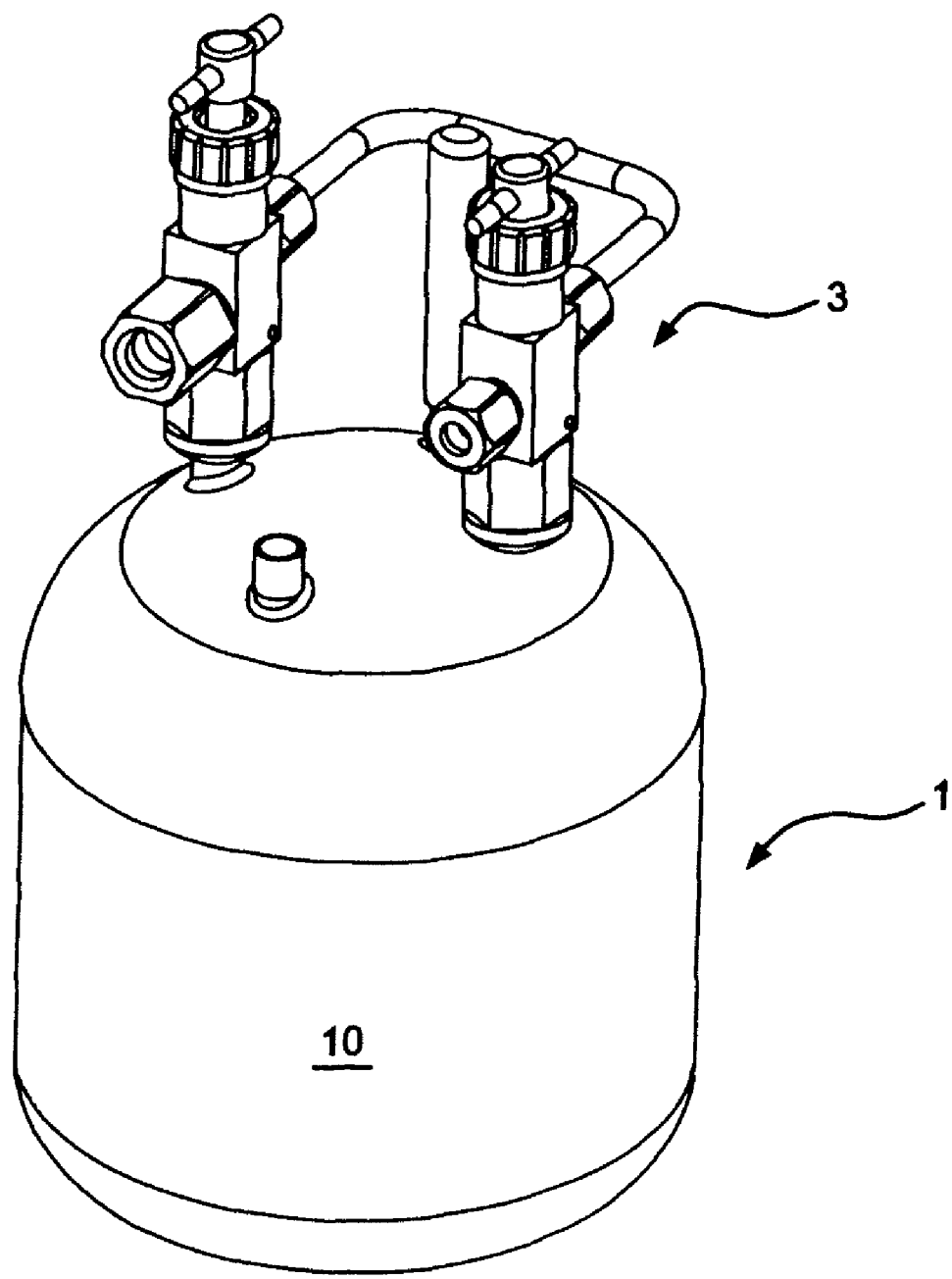

In FIGS. 1A and 1B, the container and valve-crosspurge assembly 1 is shown comprising a quartz container 10 and a valve-crosspurge fitting 3. It should be understood that the assembly can include other common features not important to the description of the present invention, such as level sensors, connections to upstream and downstream piping, weight scales and electronic sensors. In FIG. 1A, the valve-crosspurge fitting 3 has a straight connection and the valve outlets face away from one another; while in FIG. 1B the valve-crosspurge fitting 3 has a "U" shaped connection and the valve outlets face in the same direction, facilitating operator hook-up and disconnect.

Figure 2:
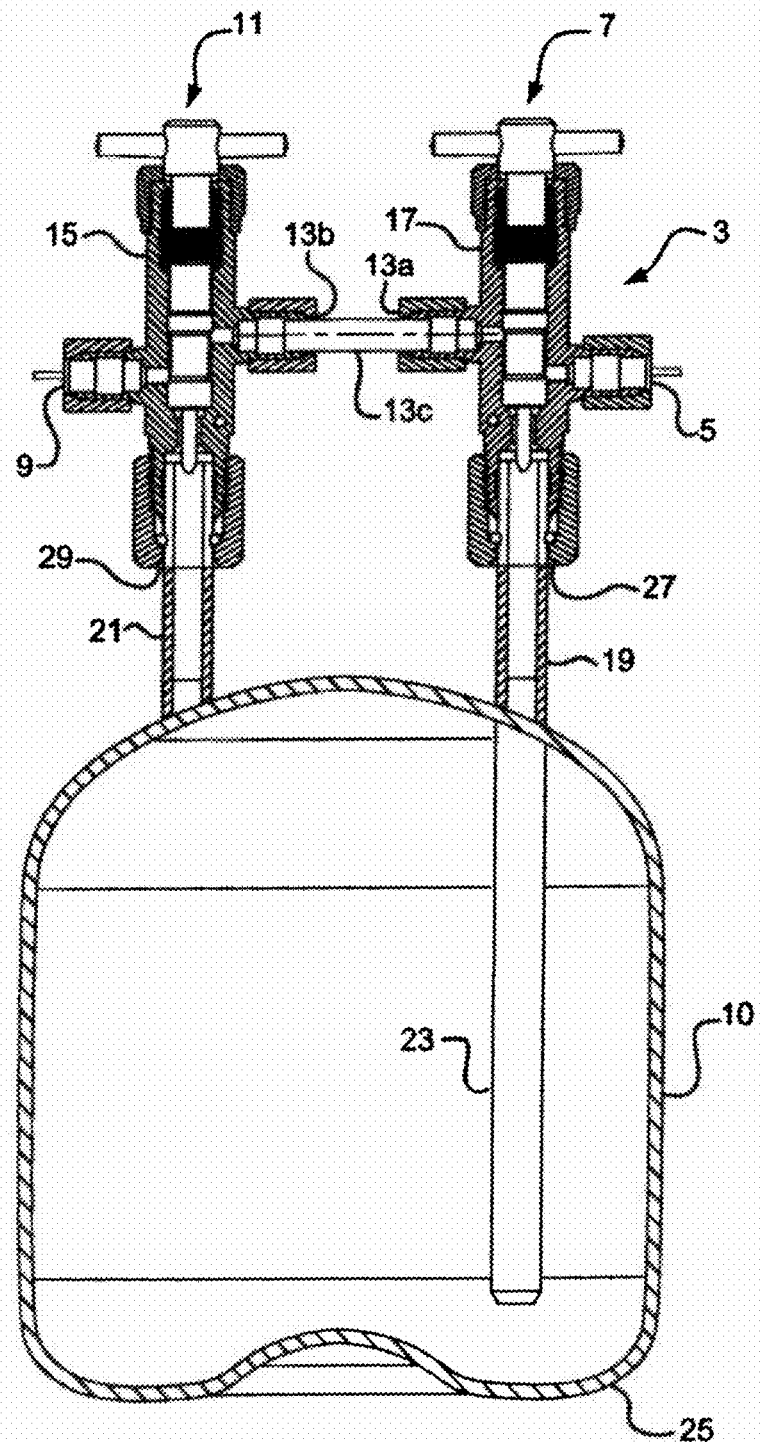
FIG. 2 is a cross-sectional view of the container and fitting of FIG. 1.

In FIG. 2, a cross-section of the container and valve-crosspurge assembly of FIG. 1 is shown wherein container 10 is equipped with the valve-crosspurge fitting 3 comprising a valve 7 and a valve 11. Valve 7 has a first orifice 27 connected to the container 10 allowing fluid flow connection between the valve 7 and the interior of the container 10 through container inlet 19 connected to a diptube 23 ending proximate to the bottom 25 of the container 10. This allows, in this configuration, for a carrier gas or push gas to enter valve 7 second orifice 5 capable of being connected to a source of pressurized carrier or push gas to bubble out of the end of diptube 23 and entrain, preferably, liquid high purity process chemical into the gas for dispensing through container outlet 21. Valve 7 also has a third orifice 13a in its valve housing 17, which forms a part of the crosspurge connection 13c between the two valves 7 and 11.

Valve 11 has similar mirror image features including housing 15, first orifice 29 connected to container outlet 21, second orifice 9, typically connected to a downstream reactor that consumes the high purity process chemical in the fabrication of semiconductor devices, such as integrated circuits or solar cell structures, third orifice 13b in its valve housing 15, which forms a part of the crosspurge connection 13c between the two valves 7 and 11.

Figure 3A:
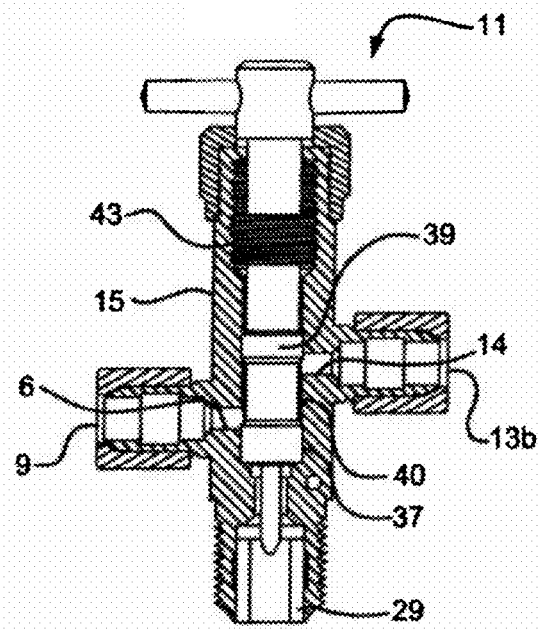
FIGS. 3A and 3B are cross-sectional views of one of the valves of the valve-crosspurge fitting in the (A) crosspurge position and (B) the product dispense position.
Figure 3B:
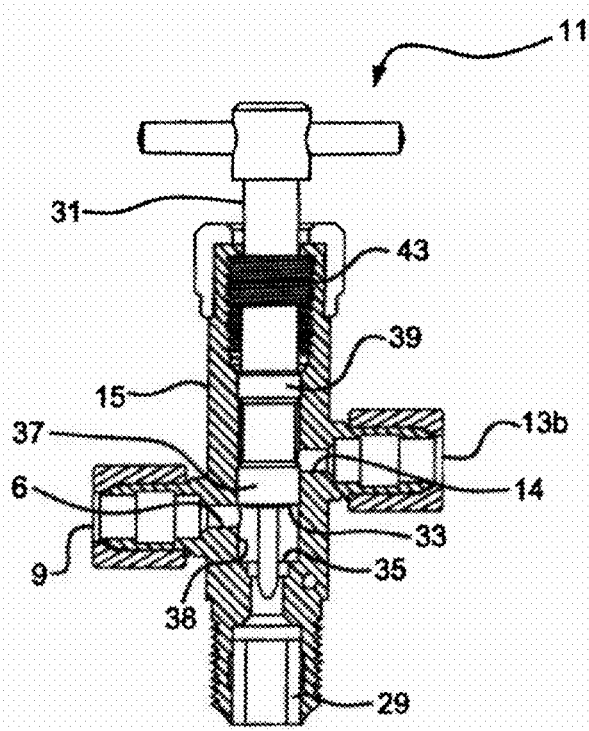

FIGS. 3A and 3B show valve 11 in isolation and in cross-section, but it should be noted that structurally, valve 11 is the mirror image of valve 7, aside from its connection to container 10 and outside piping sources, not shown. Valve 11 is shown having a valve body 15 and a valve stem 31. Valve 11 has a first orifice 29 capable of being connected to the container outlet 21, a second orifice 9 capable of being connected to a conduit for fluid flow connection outside the assembly, such as to a reactor for the consumption of the high purity process chemical, and a third orifice 13b capable of being connected to the crosspurge connection 13c, illustrated in FIG. 2. Second orifice 9 is axially spaced along the valve housing from the third orifice 13b at a "first distance", so as not to be across from or juxtapositioned from one another in the valve housing. The valve stem 31 has a first valve sealing surface 33 configured to seal against a first valve seat 35 of the valve housing 15, capable of sealing or closing fluid flow from the container outlet 21 through the valve to second orifice 9.

Valve stem 31 has a second valve sealing surface 37 of enlarged cross-section relative to the primary valve stem cross-section 31, sized and configured to seal against the inside wall 38 of the valve housing 15 to close the second orifice 9 to the first orifice 29, in the FIG. 3A position, and to close the second orifice 9 to the third orifice 13b, in the FIG. 3B position.

Valve stem 31 has a third valve sealing surface 39 of enlarged cross-section relative to the primary valve stem cross-section 31, sized and configured to seal against the inside wall 38 of the valve housing 15 to seal the valve above seal 39 proximate the threaded section 43.

The axial spacing of second valve sealing surface 37 from third valve sealing surface 39 is at least the same as the "first distance" of axial spacing of the second orifice 9 and the third orifice 13b, described above. Thus, the axial center of opening 6 of second orifice 9 and opening 14 of third orifice 13b preferably have a spacing along the axial length of the valve housing 15 equal to the distance from the edges of second valve sealing surface 37 and third valve sealing surface 39 on the valve stem 31 most proximate to one another, so as to form a fluid flow passage 40 between the third orifice 13b of the crosspurge connection 13c and the second orifice 9. Other axial spacings are contemplated that still allow the function of the valve in its several positions of the valving surfaces and valve sealing surfaces, so that axial spacings greater or lesser than the first distance can be envisioned, such as that shown in FIG. 3A.

This fluid flow passage 40 allows carrier or push gas to flow from the first valve 7 second orifice 5, through third orifice 13a and 13b, respectively of each valve and crosspurge connection 13c, through valve 11 to facilitate flushing of any high purity process chemical from both valves prior to a disconnect or changeout of the container and valve-crosspurge assembly and equally to remove ambient atmosphere prior to high purity process chemical flow after reconnection and high purity process chemical dispense is initiated. Second valve sealing surface 37 preferably is axially dimensioned so that when first valve sealing surface 33 contacts first valve seat 35, second sealing surface 37 allows opening 6 to have flow communication with opening 14 by way of fluid flow passage 40. It is envisioned that second valve sealing surface 37 can have an axial dimension adequate to completely clear opening 6 or any dimension greater or smaller that will allow adequate flow communication of opening 6 and 14 when in the position of FIG. 3A. The travel of threaded portion 43 of valve stem 31 is preferably sufficient to allow second valve sealing surface 37 to move axially from the position shown in FIG. 3B to the position shown in FIG. 3A for the given axial length of second valve sealing surface 37 in relation to the dimensions of the valve housing 15.

Figure 4:
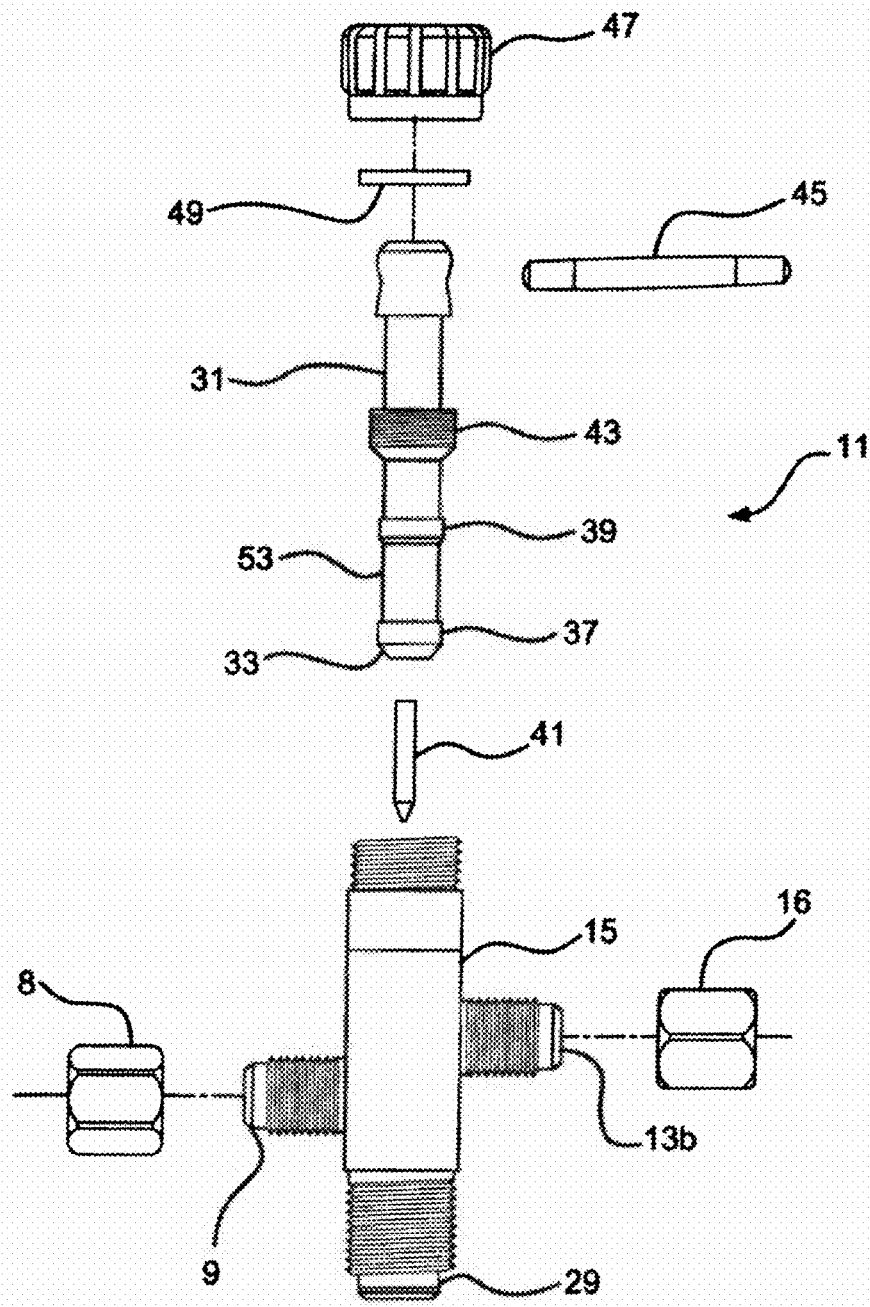
FIG. 4 is an exploded view of the parts making up the valve of the valve-crosspurge fitting.

FIG. 4 is an exploded view of valve 11 (valve 7 being a mirror image of valve 11) showing valve housing 15 with first orifice 29, second orifice 9 having a compression nut 8 to sealable connect with a pipe or conduit for fluid flow to a reactor and third orifice 13b having a compression nut 16 to sealable connect with crosspurge connection 13c, valve stem 31 having a threaded section 43, which engages a similar threaded section in valve housing 15, to allow axial movement of valve stem 31, relative to valve housing 15, first valve sealing surface 33, second valve sealing surface 37, showing clearly its enlarged cross-section relative to the primary valve stem cross-section 31, and third valve sealing surface 39, showing clearly its enlarged cross-section relative to the primary valve stem cross-section 31. Together, second valve sealing surface 37 and third valve sealing surface 39 define an area 53 of the valve stem 31, which in cooperation with the valve housing 15 forms the fluid flow passage 40. Area 53 may be of the same or similar cross-sectional dimension as valve stem 31, or area 53 may be of lesser cross-sectional dimension than valve stem 31 to create a larger overall fluid flow passage 40.

One can contemplate area 53 being of greater cross-sectional dimension than valve stem 31 so long as area 53 has a cross-sectional dimension less than second valve seating surface 37 and third valve sealing surface 39 to form a fluid flow passage 40 of adequate dimension to function as intended.

Valve stem 31 is sealably located in the cavity of valve housing 15 by split washer 49 and compression nut 47. Valve stem 31 is rotated on its axis by handle 45, which is passed through an aperture 51 in valve stem 31 and centered therein, as shown in FIGS. 5 and 6.

Valve stem 31 of either valve 7 or 11 can be outfitted with a breakseal puncture awl 41, which when the valve stem is first axially lowered toward container 10 having breakseals in its inlet and/or outlet, will break the frangible seal temporarily closing off the inlet and/or outlet, so that the high purity process chemical stored in the container can be dispensed via the mechanics of valves 7 and 11. A breakseal is typically a factory installed frangible glass or quartz membrane across the inlet and/or outlet of the filled container, giving the user an extra measure of safety and purity prior to active use when a valve is necessary to periodically switch from dispense, purge and closed status of the container and valve-crosspurge assembly.

Figure 5:
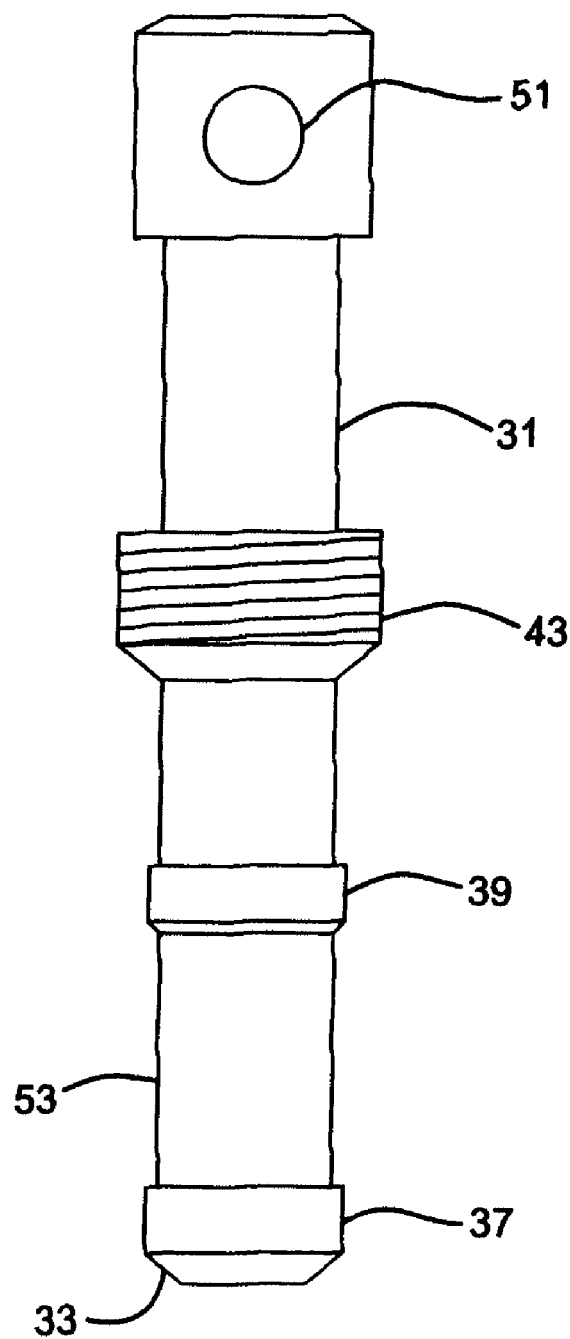
FIG. 5 is an isolated plan view of the valve stem of a valve of the valve-crosspurge fitting.

The aperture 51 is shown in FIG. 5 which illustrates a plan view of the valve stem 31 in isolation showing the threaded section 43 which engages a similar portion in valve housing 15, area 53 and sealing surfaces 33, 37 and 39.

Figure 6:
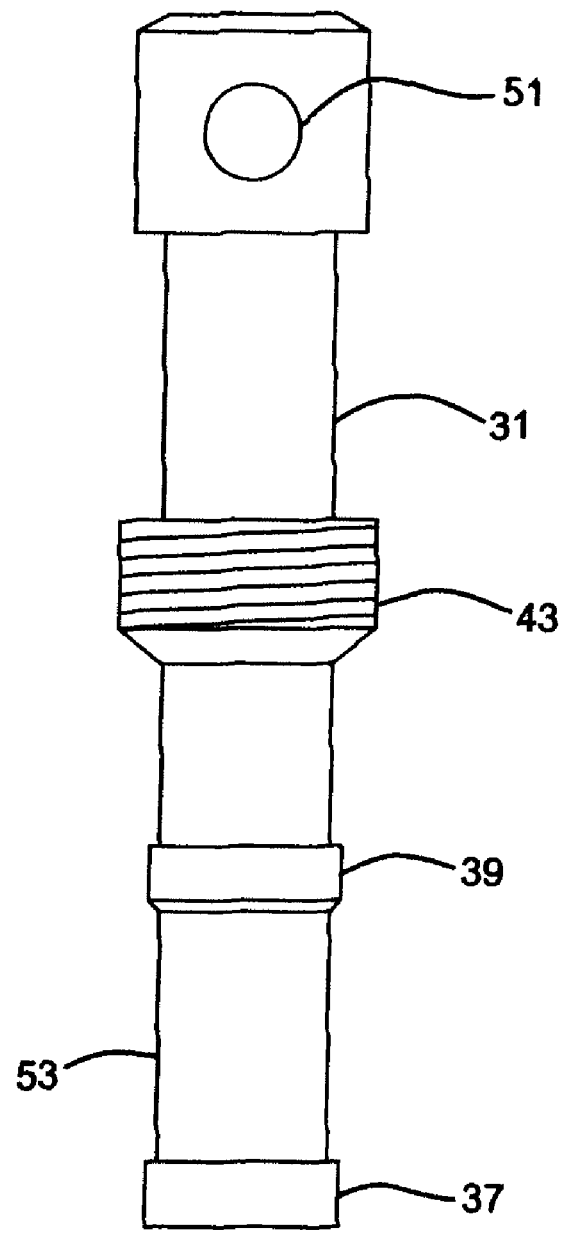
FIG. 6 is an alternate isolated plan view of the valve stem of a valve of the valve-crosspurge fitting having only two sealing surfaces.

FIG. 6 illustrates a plan view of an alternative embodiment valve stem 31 in isolation showing the threaded section 43 which engages a similar portion in valve housing 15, area 53 and having only sealing surfaces 37 (lower valve sealing surface for this embodiment) and 39 (upper valve sealing surface for this embodiment). Sealing surface 33 is not used in this alternate embodiment and sealing of the container relies upon sealing surface 37.

As stated previously, the valve-crosspurge fitting has been described with reference particularly to valve 11, but it is evident that valve 7 has similar features merely arrayed in mirror image to valve 11 and it is not necessary to separately describe those features which function in a similar or the same manner.

Although the container and valve-crosspurge assembly has been described and illustrated for storage and dispense of a liquid high purity process chemical where valve 7 introduces a carrier gas into container 10 via diptube 23 to bubble through the liquid high purity process chemical and entrain chemical into the gas before exiting through valve 11 for vapor dispense; it is also contemplated that the container and valve-crosspurge assembly can be operated to use a push gas introduced through valve 11 into the headspace above liquid high purity process chemical in container 10 to push liquid chemical up diptube 23 for liquid dispense out of valve 7. This is accomplished merely by switching the connections of the second orifices of valve 7 and 11 between one another.

The carrier or push gas is typically an inert gas such as nitrogen, helium, argon or mixtures thereof at sufficient elevated pressure to remove the high purity process chemical from the container. Reactive gases are also contemplated such as hydrogen.

In one embodiment the invention consists of a 1.5 L quartz bubbler container with identical 3-way valves mounted on the bubbler container inlet and outlet stems (mirror images of one another). Each 3-way valve has a crosspurge orifice that is piped to the crosspurge orifice of the opposite valve via a crosspurge connector pipe.

When both valves are in the fully closed position, the crosspurge connector is in communication with the valves' second orifices constituting the inlet and outlet of the bubbler container and valve-crosspurge assembly. This enables a path for a flow of inert gas to travel from the inlet of the assembly or second orifice of the valve attached to the bubbler container inlet, across the crosspurge connector, and exiting out the outlet of the assembly or second orifice of the valve attached to the bubbler container outlet.

When the inlet valve handle is rotated towards the open position (counter clock wise), the travel of the valve stem will first fully close off the third orifice connecting to the cross-purge connection, and with further travel to the open position, then fully open a path across the valve from the bubbler container inlet to the dip tube. Likewise, when rotating the handle of the valve connected to the outlet of the bubbler container towards the open position (counter clock wise), the travel of the valve stem will first fully close off the third orifice connecting to the cross-purge connection, and then with subsequent additional travel to fully open, will open the passage from the bubbler container's outlet providing full communication of the outlet with the bubbler container head space (vapor space).

At no time during the travel of the valve stem from fully closed to fully open position, will all three valve orifices be in simultaneous fluid flow communication. Such undesired simultaneous fluid flow communication of all three orifices might allow more than one path of travel through the valve that might allow liquid chemical to be pushed up the diptube into the inlet or the cross-purge connection. Liquid in the valve stem or the cross-purge connection would be difficult to remove, and could result in a dangerous release of chemical during a bubbler container disconnect. This problem inherent in prior art container and valve assemblies, has been overcome by the present invention, as described above.

The components of the assembly of the present invention alternately can be fabricated from Monel™, Incoloy™, Hastelloy™ metal alloys as set forth in Table 1 below.

TABLE 1

| Comercial designation | C % | Co % | Cr % | Mo % | Ni % | V % | W % | Al % | Cu % | Nb/Cb Ta % | Ti % | Fe % | Other % |
|---|---|---|---|---|---|---|---|---|---|---|---|---|---|
| Monel 400 | 0.12 | — | — | — | 65.0 | — | — | — | 32.0 | — | — | 1.5 | Mn 1.0 |
| Monel 401 | 0.10 | — | — | — | 43.0 | — | — | — | 53.0 | — | — | 0.75 | Si 0.25; Mn 2.25 |
| Monel 404 | 0.15 | — | | | 52.0-57.0 | — | — | 0.05 | rest/bal | — | — | 0.50 | Mn 0.10; Si 0.10;S 0.024 |
| Monel 502 | 0.10 | — | — | — | 63.0-17.0 | — | — | 2.5-3.5 | rest/bal | — | 0.50 | 2.0 | Mn 1.5; Si 0.5; S 0.010 |
| Monel K 500 | 0.13 | — | — | — | 64.0 | — | — | 2.8 | 30.0 | — | 0.6 | 1.0 | Mn 0.8 |
| Monel R 405 | 0.15 | — | — | — | 66.0 | — | — | — | 31.0 | — | — | 1.2 | Mn 1.0; S 0.04 |
| Hastelloy B | 0.10 | 1.25 | 0.60 | 28.0 | rest/bal | 0.30 | — | — | — | — | — | 5.50 | Mn 0.80; Si 0.70 |
| Hastelloy B2 | 0.02 | 1.0 | 1.0 | 26.0-30.0 | rest/bal | — | — | — | — | — | — | 2.0 | Mn 1.0; Si 0.10 |
| Hastelloy C | 0.07 | 1.25 | 16.0 | 17.0 | rest/bal | 0.30 | 40 | — | — | — | — | 5.75 | Mn 1.0; Si 0.70 |
| Hastelloy C4 | 0.015 | 2.0 | 14.0-18.0 | 14.0-17.0 | rest/bal | — | — | — | — | — | 0.70 | 3.0 | Mn 1.0; Si 0.08 |
| Hastelloy C 276 | 0.02 | 2.5 | 14.0-16.5 | 15.0-17.0 | rest/bal | 0.35 | 3.0-4.5 | — | — | — | — | 4.0-7.0 | Mn 1.0; Si 0.05 |
| Hastelloy F | 0.02 | 1.25 | 22.0 | 6.5 | rest/bal | — | 0.50 | — | — | Nb 2.10 | — | 21.0 | Mn 1.50; Si 0.50 |
| Hastelloy G | 0.05 | 2.5 | 21.0-23.5 | 5.5-7.5 | rest/bal | — | 1.0 | — | 1.5-2.5 | Nb 1.75-2.5 | — | 18.0-21.0 | Mn 1.0-2.0; P 0.04; Si 1.0 |
| Hastelloy G-2 | 0.03 | — | 23.0-26.0 | 5.0-7.0 | 47.0-52.0 | — | — | — | 0.70-1.20 | — | 0.70-1.50 | rest/bal | Mn 1.0; Si 1.0 |
| Hastelloy N | 0.06 | 0.25 | 7.0 | 16.5 | rest/bal | — | 0.20 | — | 0.10 | — | — | 3.0 | Mn 0.40; Si 0.25; B 0.01 |
| Hastelloy S | 0.02 | 2.0 | 15.5 | 14.5 | rest/bal | 0.6 | 1.0 | 0.20 | — | — | — | 3.0 | Mn 0.50; Si 0.40; B 0.0009; La 0.02 |
| Hastelloy W | 0.06 | 1.25 | 5.0 | 24.5 | rest/bal | — | — | — | — | — | — | 5.5 | Mn 0.050; Si 0.50 |
| Hastelloy X | 0.10 | 1.50 | 22.0 | 9.0 | rest/bal | — | 0.60 | — | — | — | 18.5 | — | Mn 0.6; Si 0.60 |
| Incoloy 800 | 0.04 | — | 21.0 | — | 32.0 | — | — | 0.3 | — | — | 0.4 | 45.0 | — |
| Incoloy 800 H | 0.08 | — | 21.0 | — | 32.0 | — | — | 0.3 | — | — | 0.4 | 45.0 | — |
| Incoloy 801 | 0.05 | — | 20.5 | — | 32.0 | — | — | — | — | — | 1.1 | 45.0 | — |
| Incoloy 802 | 0.35 | — | 21.0 | — | 32.0 | — | — | 0.6 | — | — | 0.7 | 45.0 | — |
| Incoloy 804 | 0.05 | — | 29.5 | — | 41.0 | — | — | 0.3 | — | — | 0.6 | 25.4 | — |
| Incoloy 805 | 0.12 | — | 7.5 | 0.50 | 36.0 | — | — | — | 0.10 | — | — | rest/bal | Mn 0.60; Si 0.50 |
| Incoloy 810 | 0.25 | — | 21.0 | — | 32.0 | — | — | — | 0.50 | — | — | rest/bal | Mn 0.90; Si 0.80 |

TABLE 1-continued

| Comercial designation | C % | Co % | Cr % | Mo % | Ni % | V % | W % | Al % | Cu % | Nb/Cb Ta % | Ti % | Fe % | Other % |
|---|---|---|---|---|---|---|---|---|---|---|---|---|---|
| Incoloy 825 | 0.04 | — | 21.0 | 3.0 | 42.0 | — | — | — | 2.0 | — | 1.0 | 30.0 | — |
| Incoloy 825 Cp | 0.04 | — | 21.5 | 3.0 | 42.0 | — | — | — | 2.2 | Nb 0.9 | — | 30.0 | — |
| Incoloy 840 | 0.08 | — | 20.0 | — | 20.0 | — | — | — | — | — | — | rest/bal | Mn 1.0; Si 1.0 |
| Incoloy 901 | 0.05 | — | 12.5 | 6.0 | rest/bal | — | — | 0.15 | — | — | 2.70 | 34.0 | Mn 0.24; Si 0.12; B 0.015 |
| Incoloy 901 Mod | 0.05 | — | 12.5 | 5.80 | rest/bal | — | — | — | — | — | 2.9 | 34.0 | Mn 0.09; Si 0.08; B 0.015 |
| Incoloy 903 | 0.02 | 15.0 | — | — | 38.0 | — | — | 0.7 | — | Nb 3.0 | 1.4 | 41.0 | — |
| Incoloy 904 | 0.02 | 14.0 | — | — | 33.0 | — | — | — | — | — | 1.7 | 50.0 | — |
| Incoloy DS | 0.06 | — | 18.0 | — | 37.0 | — | — | — | — | — | — | 42.0 | Mn 1.0; Si 2.3 |
| Incoloy Ma 956 | — | — | 20.0 | — | — | — | — | 4.5 | — | — | 0.5 | 74.4 | Y$_2$O$_3$ 0.5 |
| Incoloy 600 | 0.05 | — | 15.5 | — | 75.0 | — | — | — | — | — | — | 8.0 | — |
| Incoloy 601 | 0.05 | — | 23.0 | — | 60.0 | — | — | 1.4 | — | — | — | 14.0 | — |
| Incoloy 604 | 0.04 | — | 15.8 | — | rest/bal | — | — | — | 0.10 | Nb 2.0 | — | 7.20 | Mn 0.20; Si 0.20 |
| Incoloy 610 | 0.20 | — | 15.5 | — | rest/bal | — | — | — | 0.50 | Nb 1.0 | — | 9.0 | Mn 0.90; Si 2.0 |
| Incoloy 617 | 0.07 | 12.5 | 22.5 | 9.0 | 54.0 | — | — | 1.0 | — | — | — | — | — |
| Incoloy 625 | 0.05 | — | 21.5 | 9.0 | 61.0 | — | — | 0.40 | — | Nb 3.65 | 0.40 | 2.5 | Mn 0.50; Si 0.50 |
| Incoloy 671 | 0.05 | — | 48.0 | — | 51.0 | — | — | — | — | — | 0.35 | — | — |
| Incoloy 700 | 0.12 | 28.5 | 15.0 | 3.75 | 46.0 | — | — | 3.0 | 0.05 | — | 2.20 | 0.70 | Mn 0.10; Si 0.30 |
| Incoloy 702 | 0.04 | — | 15.6 | — | rest/bal | — | — | 3.4 | 0.10 | — | 0.70 | 0.35 | Mn 0.05; Si 0.20 |
| Incoloy 705 | 0.30 | — | 15.5 | — | rest/bal | — | — | — | 0.50 | — | — | 8.0 | Mn 0.90; Si 5.5 |

In addition, an Hastelloy alloy not listed in Table 2 is Hastelloy B3 which has a composition of: Ni—65%; Mo—28.5%; Cr—1.5%; Fe—1.5%; Co—3%; W—3%; Mn—3%; Al—0.5%; Ti—0.2%; Si—0.1% and C—0.01% (wt %).

The assembly of the present invention can also be fabricated entirely or in various components, such as sealing surfaces, of polymers/plastics comprising polyvinylidene fluoride, polychlorotrifluoroethylene, polyether-ether ketone, polyimides, polytetrafluoroethylene, copolymer of tetrafluoroethylene and perfluoroalkoxy resin.

Other possible materials of construction include stainless steel, brass, nickel, copper, glass, quartz and combinations thereof.

The invention claimed is:

1. A container and valve-crosspurge assembly for storing and dispensing high purity process chemical, comprising;
   (A) a container for containing a high purity process chemical having an inlet and an outlet for dispensing high purity process chemical and introducing a carrier gas to assist in dispensing the high purity process chemical;
   (B) a valve-crosspurge fitting comprising;
      (i) a first valve; and,
      (ii) a second valve,
   one of such valves connected to the inlet of the container and the other of such valves connected to the outlet of such container; and,
      (iii) a crosspurge connection between the first and second valves that provides fluid flow connection between the two valves separately from the container;
   wherein, each valve has;
      (a) a first orifice to the container;
      (b) a second orifice to a conduit for fluid flow connection outside the assembly; and,
      (c) a third orifice to the crosspurge connection axially displaced a first distance from the second orifice in the valve;
      (d) a valve housing; and,
      (e) a valve stem capable of moving in the valve housing to one of two positions: (1) container open and (2) crosspurge open-container closed; wherein, the valve stem has three valve sealing surfaces:
         (I) a first valve sealing surface configured to seal against a first valve seat to close the first orifice to the container;
         (II) a second valve sealing surface of enlarged cross-section, relative to a primary valve stem cross-section, configured to seal against an inside wall of the valve housing to close the second orifice to the first orifice; and,
         (III) a third valve sealing surface of enlarged cross-section, relative to the primary valve stem cross-section, configured to seal against the inside wall of the valve housing to form with the second valve sealing surface a flow passage between the third orifice of the crosspurge connection and the second orifice, wherein the axial spacing of the second valve sealing surface from the third valve sealing surface on the valve stem is at least as great as the first distance, recited in (c) so as to form the flow passage, recited in (III).

2. The assembly of claim 1 wherein the valve stem has a breakseal plunger on the end of the valve stem proximate to the first orifice.

3. The assembly of claim 1 wherein the valve stem threadably engages the valve housing to axially move within the valve housing to the (1) container open and (2) crosspurge open-container closed positions upon rotation of the valve stem in the valve housing.

4. The assembly of claim 1 wherein the valve housing material of construction is selected from the group consisting of: stainless steel, plastic, polytetrafluoroethylene, copolymer of tetrafluoroethylene and perfluoroalkoxy resin, polyvinylidene fluoride, polychlorotrifluoroethylene, polyether-ether ketone or polyimides, Monel™ metal alloy, Hastelloy™ metal alloy, Incoloy™ metal alloy; brass, nickel, copper, glass, quartz and combinations thereof.

5. The assembly of claim 1 wherein the valve stem material of construction is selected from the group consisting of: stainless steel, plastic, polytetrafluoroethylene, copolymer of tetrafluoroethylene and perfluoroalkoxy resin, polyvinylidene fluoride, polychlorotrifluoroethylene, polyether-ether ketone or polyimides, Monel™ metal alloy, Hastelloy™ metal alloy, Incoloy™ metal alloy; brass, nickel, copper, glass, quartz and combinations thereof.

6. The assembly of claim 1 wherein the container material of construction is selected from the group consisting of: stainless steel, plastic, polytetrafluoroethylene, Monel™ metal alloy, Hastelloy™ metal alloy, Incoloy™ metal alloy; brass, nickel, copper, glass, quartz and combinations thereof.

7. The assembly of claim 1 wherein the container inlet has a diptube projecting into the container and ending proximate the bottom of the container.

8. The assembly of claim 1 having a level sense mechanism capable of indicating the level of high purity process chemical in the container.

9. The assembly of claim 1 wherein the axial centers of an opening of the second orifice 9 and an opening of the third orifice have a spacing along the axial length of the valve housing equal to the distance from the edges of the second valve sealing surface and the third valve sealing surface on the valve stem most proximate to one another.

10. The assembly of claim 7 wherein the first valve is connected to the container inlet at the first valve's first orifice and the first valve's second orifice is connected to a source of carrier gas.

11. The assembly of claim 10 wherein the second valve is connected to the container outlet at the second valve's first orifice and the second valve's second orifice is connected to a reactor capable of consuming the high purity chemical.

12. A container and valve-crosspurge assembly for storing and dispensing high purity process chemical, comprising;
 (A) a container for containing a high purity process chemical having an inlet and an outlet for dispensing high purity process chemical and introducing a carrier gas to assist in dispensing the high purity process chemical;
 (B) a valve-crosspurge fitting comprising;
  (i) a first valve; and,
  (ii) a second valve,
one of such valves connected to the inlet of the container and the other of such valves connected to the outlet of such container; and,
  (iii) a crosspurge connection between the first and second valves that provides fluid flow connection between the two valves separately from the container;
wherein, each valve has;
 (a) a first orifice to the container;
 (b) a second orifice to a conduit for fluid flow connection outside the assembly; and,
 (c) a third orifice to the crosspurge connection axially displaced a first distance from the second orifice in the valve;
 (d) a valve housing; and,
 (e) a valve stem capable of moving in the valve housing to one of two positions: (1) container open and (2) crosspurge open-container closed; wherein, the valve stem has two valve sealing surfaces:
 (I) a lower valve sealing surface of enlarged cross-section, relative to a primary valve stem cross-section, configured to seal against an inside wall of the valve housing to close the second orifice to the first orifice; and,
 (II) an upper valve sealing surface of enlarged cross-section, relative to the primary valve stem cross-section, configured to seal against the inside wall of the valve housing to form with the lower valve sealing surface a flow passage between the third orifice of the crosspurge connection and the second orifice, wherein the axial spacing of the lower valve sealing surface from the upper valve sealing surface on the valve stem is at least as great as the first distance, recited in (c) so as to form the flow passage, recited in (II).

\* \* \* \* \*